June 1, 1965
L. W. PARRY
3,187,105
PULSE CORRECTOR
Filed April 20, 1962
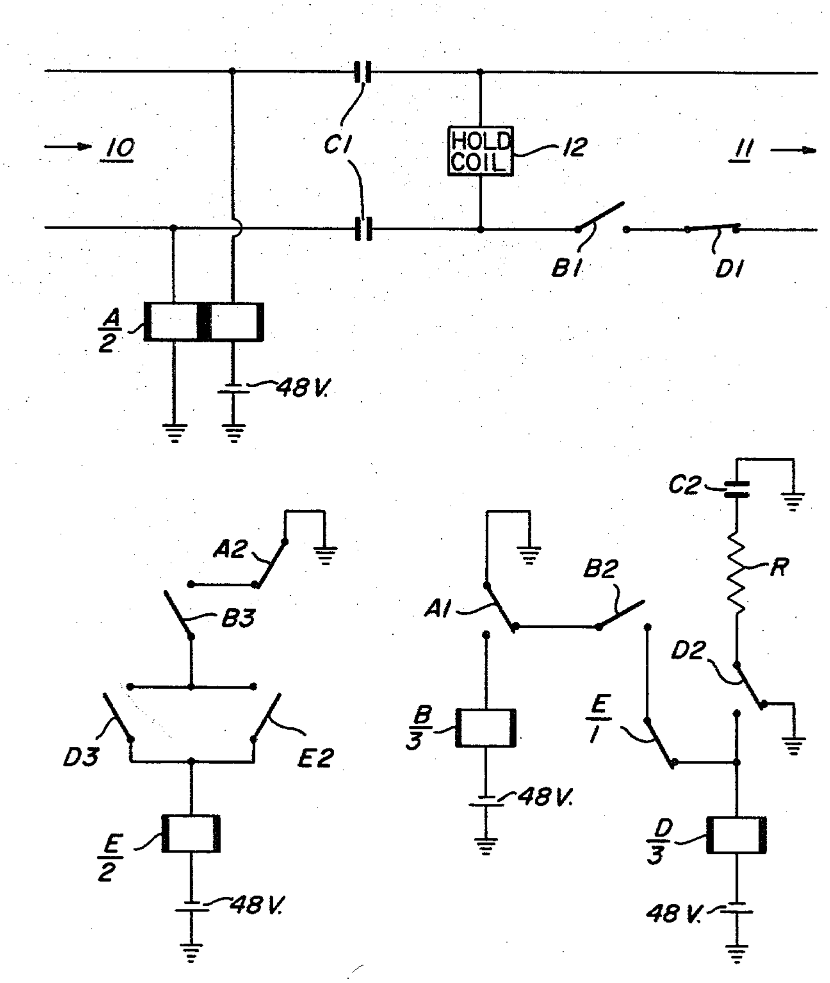
INVENTOR
LEONARD W. PARRY
BY Smart & Biggar
ATTORNEYS.

United States Patent Office 3,187,105
Patented June 1, 1965

3,187,105
PULSE CORRECTOR

Leonard William Parry, Montreal, Quebec, Canada, assignor to Northern Electric Company Limited, Montreal, Quebec, Canada Filed Apr. 20, 1962, Ser. No. 189,188
2 Claims. (Cl. 179—16)

The invention relates to pulse correctors for electrical signaling systems such as dial telephone systems and is concerned with correcting the pulse times, i.e., pulse durations, while the pulses are being repeated.

Circuits have been proposed for pulse correcting repeaters using repeating coils and several relays for reforming the pulses. A difficulty of such circuits is that interruptions of the circuit during pulsing (dialing) causes a back E.M.F. effect which distorts the outgoing dialing digit pulses. Also the previous pulse correcting circuits have not been adapted to the wider dial speed limits which have been introduced.

A pulse corrector according to the present invention requires fewer relays while providing output pulses of fixed durations which are formed at the same time the distorted input pulses are received. This is done by four relays and a timing circuit. One of the relays is an input pulsing relay responsive to direct current pulses from the input circuit to operate a slow-to-release relay. The third relay is a timing circuit relay responsive to a combined effect of operation of the slow-to-release relay and restoration of the input relay. The fourth relay is a start-timing relay responsive to a combined effect of operation of slow-to-release relay and operation of the timing circuit relay as well as restoration of the input relay. The timing circuit is provided for the purpose of restoring the timing circuit relay at a predetermined time after operation of the start-timing relay. Two series connected switches are provided in the output circuit, one controlled by the slow-to-release relay and adapted to be opened when the slow-to-release relay is in non-operated state and the other being controlled by the timing circuit relay and adapted to be closed when the timing relay is in non-operated state. Operation of the series connected switches by the relays causes the input pulses to be repeated in the output circuit with their times, i.e., durations, corrected.

In accordance with the invention, a pulse corrector is provided requiring only four relays and a timing circuit. The pulse times are corrected while the pulsing speed remains unaltered because the pulses are reformed at the same time that they are being repeated. The time or duration of each repeated pulse is determined by the operating times of the timing circuit and start timing relays, the time constant of the timing circuit and the release time of the timing circuit relay.

The invention will be described further with reference to the accompanying drawing showing a schematic circuit diagram of a pulse corrector in accordance with the invention.

In the drawing, circuits 10 and 11 are respectively the input and output circuits of the pulse corrector and form part of a conventional dial telephone system. The output circuit 11 includes a hold or retard coil 12 which completes the direct current circuit between the two sides of the output circuit 11 while acting as a choke to retard the flow of alternating current or rapidly varying currents which might cause an undesirable pumping action in the output circuit. Capacitors C1 are 2 mf. capacitors connected between the circuits 10 and 11 to prevent D.C. pulses leaking into circuit 11.

A conventional type of line relay A is connected across the input circuit 10 in a well known manner. The switch contacts A1 and A2 of the line relay A are connected in the operating circuits of a slow-to-release relay B and a start-timing relay E. The switch contacts of the slow-to-release relay B are the switch contact B1 connected in the output circuit 11, the switch contact B2 connected in the operating circuit of a timing circuit relay D and the switch contact B3 is connected in the operating circuit of a start-timing relay E. The switch contacts of the timing circuit relay D are the switch contact D1 connected in series with the switch contact B1 in the output circuit 11, the switch contact D2 series connected from the operating coil of the timing circuit relay D to the timing circuit formed by the resistor R and capacitor C2, and the switch contact D3 is connected in the operating circuit of the start-timing relay E. The start-timing relay E has two switch contacts, the one designated E1 connected in an operating circuit of the timing circuit relay D and the other designated E2 acting as a hold switch contact connected in the operating circuit of the start-timing relay E.

When considering the operation of the circuit, it is necessary to keep in mind that the line relay A is a pulsing relay which restores for each received pulse. The slow-to-release relay B is, as its name implies, a relay which remains operated much longer than the line relay A so that during the dialing of a digit the slow-to-release relay B remains operated for the entire sequence of pulses which represent the digit dialed.

The input pulses are received by the line relay A and are repeated by the switch contact D1 of the timing circuit relay D. When a pulse in the input circuit 10 operates the relay A, the switch contact A1 closes operating the slow-to-release B which remains operated after the contact A1 opens upon restoration of the line relay A. Operation of the slow-to-release B causes all its switch contacts B1, B2 and B3 to close. These contacts remain closed while the line relay A is receiving the sequence of pulses for the dialed digit. Each time the switch contact A1 releases it operates the timing circuit relay D through the closed contacts B2 and E1. Operation of the timing circuit relay D causes its switch contacts D2 and D3 to close. Closing of the switch contact D3 operates the start-timing relay E which locks in operated condition through the closing of its switch contact E2. Operation of the start-timing relay E causes its switch contact E1 to open disconnecting the operating circuit of the timing circuit relay D. However, the timing circuit D is now held operative by the current which flows through its closed switch contact D2 to the timing circuit composed of the resistor R and capacitor C2. As the capacitor C2 charges, the current through the operating coil of the timing circuit relay D falls and eventually the timing circuit relay D releases. Its switch contact D1 then closes terminating the pulse in the output circuit 11. The switch contact D1 is operated for each pulse of the dialed digit and, at the end of transmission of the pulses forming one digit, the switch contact B1 opens.

The operating times of the timing circuit relay D and of the start-timing relay E as well as the time constant of the timing circuit and the release time of the timing circuit relay D form a time base which determines the durations of pulses in the output circuit 11 so that output pulses of corrected durations are provided in the output circuit 11 even though the pulses received in the input circuit 10 are shorter or longer than is desired. The corrector circuit can be used for long range loop pulsing as well as for local pulsing. Dial pulses from a step-by-step office can be repeated to another step-by-step office, a call indicator office or a crossbar office. Normally the corrector circuit is used on inter-office trunks where distorted pulses would fail to operate distant terminating switches. The distorted pulses might be longer or shorter than normal pulses caused by high loop resistance, excessive leakage or numerous pulse repeaters in tandem. A pulse corrector according to the invention shapes the pulses to ensure satisfactory operation at the terminating end of the line.

What I claim as my invention is:

1. A pulse corrector for receiving direct current pulses from an input circuit and causing corrected direct current pulses in an output circuit carrying direct current, comprising an input relay responsive to direct current pulses from the input circuit, a slow-to-release relay responsive to operation of said input relay, a timing circuit relay responsive to a combined effect of operation of the slow-to-release relay and restoration of said input relay, a start-timing relay responsive to a combined effect of operation of the slow-to-release relay and operation of the timing circuit relay and restoration of said input relay, a timing circuit adapted to restore the timing circuit relay at a predetermined time after operation of the start-timing relay, a switch controlled by the slow-to-release relay and adapted to be open when the slow-to-release relay is in non-operated state, a switch controlled by the timing circuit relay and adapted to be closed when the timing circuit relay is in non-operated state, each said switch being in series connection in the output circuit and upon operation adapted to cause direct current pulses in the output circuit.

2. A pulse corrector as defined in claim 1 in which the timing circuit comprises: a capacitor, a resistor and a switch contact of the timing circuit relay connected in series with the operating coil of the timing circuit relay; said switch contact being open when the operating coil of the timing circuit relay is deenergized.

References Cited by the Examiner

UNITED STATES PATENTS

| | | | |
|---|---|---|---|
| 1,747,405 | 2/30 | Von Beckerath | 179—16 |
| 1,861,196 | 5/32 | Stokley | 179—16 |
| 2,420,713 | 5/47 | McCreary | 179—16 |
| 2,608,608 | 8/52 | Handschin | 317—141 |
| 2,717,278 | 9/55 | Blackhall et al. | 179—16 |
| 2,898,404 | 8/59 | Alizon | 178—70 |

ROBERT H. ROSE, *Primary Examiner.*

WALTER L. LYNDE, *Examiner.*